(12) United States Patent
Belanger et al.

(10) Patent No.: US 10,348,153 B2
(45) Date of Patent: Jul. 9, 2019

(54) HVAC BLOWER MOTOR ASSEMBLY

(71) Applicants: DENSO International America, Inc., Southfield, MI (US); DENSO CORPORATION, Kariya, Aichi-pref. (JP)

(72) Inventors: Brian Belanger, Rochester Hills, MI (US); Christian Rippel, Eching (DE)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 142 days.

(21) Appl. No.: 15/791,853

(22) Filed: Oct. 24, 2017

(65) Prior Publication Data
US 2019/0123611 A1    Apr. 25, 2019

(51) Int. Cl.
| | |
|---|---|
| H02K 5/20 | (2006.01) |
| H02K 5/24 | (2006.01) |
| H02K 7/14 | (2006.01) |
| H02K 11/30 | (2016.01) |
| F04D 29/58 | (2006.01) |
| H02K 9/06 | (2006.01) |
| F04D 25/06 | (2006.01) |

(52) U.S. Cl.
CPC .......... *H02K 5/20* (2013.01); *F04D 29/5813* (2013.01); *H02K 5/24* (2013.01); *H02K 7/14* (2013.01); *H02K 9/06* (2013.01); *H02K 11/30* (2016.01); *F04D 25/06* (2013.01)

(58) Field of Classification Search
CPC ...... F04D 29/58; F04D 29/5813; F04D 25/06; H02K 5/20; H02K 5/24; H02K 11/30; H02K 7/14; H02K 9/06
USPC ............................ 310/89, 52, 54, 57, 59, 64
See application file for complete search history.

(56) References Cited

U.S. PATENT DOCUMENTS

| | | | | |
|---|---|---|---|---|
| 5,127,148 A * | 7/1992 | Lykes | ...................... | H02K 5/15 29/596 |
| 7,196,439 B2 * | 3/2007 | Pierret | ...................... | H02K 9/20 310/58 |
| 8,970,076 B2 * | 3/2015 | Isoda | ........................ | H02K 9/06 310/58 |
| 2009/0010782 A1 * | 1/2009 | Bartsch | .................. | H02K 5/225 417/423.2 |
| 2012/0096902 A1 * | 4/2012 | Major | ................... | D06F 37/206 68/140 |
| 2014/0175914 A1 * | 6/2014 | Zeng | ....................... | H02K 5/20 310/51 |

(Continued)

Primary Examiner — Naishadh N Desai
(74) Attorney, Agent, or Firm — Harness, Dickey & Pierce, P.L.C.

(57) ABSTRACT

A blower motor assembly including a blower motor case for housing a blower motor therein. A controller retention portion of the blower motor case is configured to accommodate a controller within the blower motor case. An airflow inlet is defined by the blower motor case at an exterior of the blower motor case. An airflow passageway of the blower motor case extends from the airflow inlet to the controller retention portion to direct airflow to the controller. A flange of the blower motor case is at an end of the airflow passageway that is opposite to the airflow inlet. The flange is arranged opposite to the controller retention portion and to the controller to direct to the controller airflow that has passed through the airflow inlet and the airflow passageway.

20 Claims, 1 Drawing Sheet

(56) References Cited

U.S. PATENT DOCUMENTS

2014/0265664 A1\* 9/2014 Camilleri ............... H02K 15/14
　　　　　　　　　　　　　　　　　　　　　310/59

\* cited by examiner

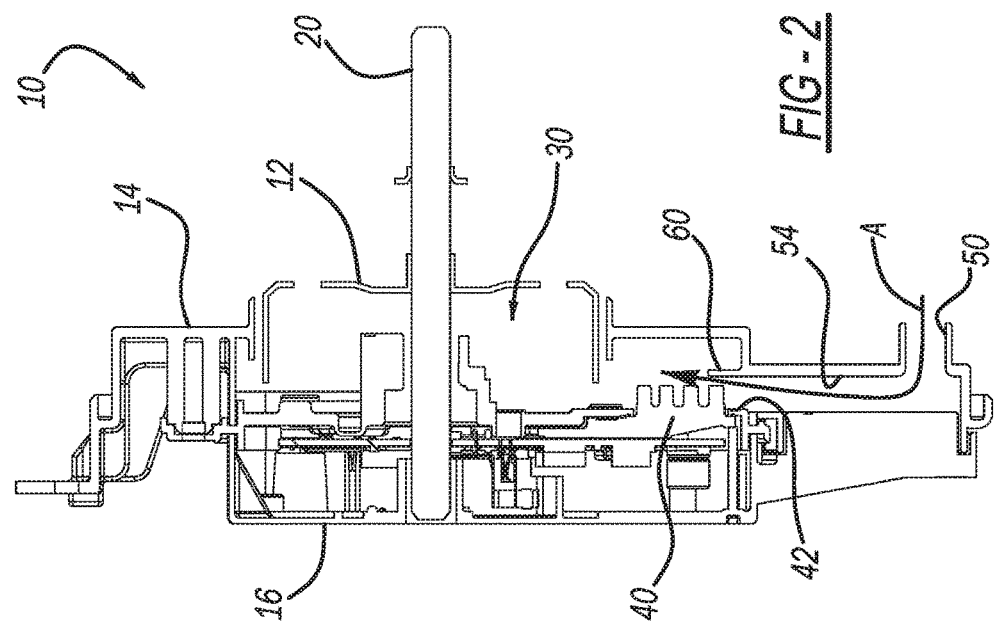
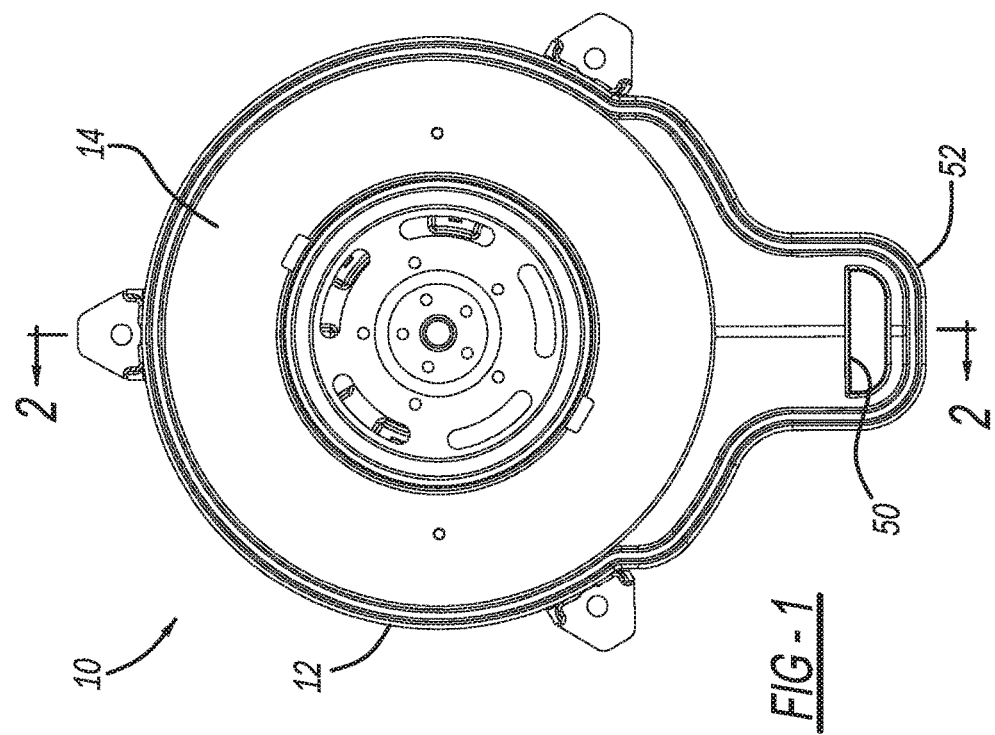

HVAC BLOWER MOTOR ASSEMBLY

FIELD

The present disclosure relates to a blower motor assembly for a heating, ventilation, and air conditioning (HVAC) system.

BACKGROUND

This section provides background information related to the present disclosure, which is not necessarily prior art.

HVAC blower motor assemblies typically include a controller, which must be cooled to operate optimally. Recently, blower motor airflow requirements have increased. To provide additional airflow, HVAC blowers are being provided with larger motors, which has increased the need to cool the controller and required a larger case. An HVAC assembly that provides increased airflow to the controller to cool the controller would therefore be desirable. The present teachings advantageously provide for HVAC assemblies that direct additional airflow to the controller to sufficiently cool the controller. One skilled in the art will appreciate that the present teachings provide for numerous additional advantages as well.

SUMMARY

This section provides a general summary of the disclosure, and is not a comprehensive disclosure of its full scope or all of its features.

The present teachings provide for a blower motor assembly including a blower motor case for housing a blower motor therein. A controller retention portion of the blower motor case is configured to accommodate a controller within the blower motor case. An airflow inlet is defined by the blower motor case at an exterior of the blower motor case. An airflow passageway of the blower motor case extends from the airflow inlet to the controller retention portion to direct airflow to the controller. A flange of the blower motor case is at an end of the airflow passageway that is opposite to the airflow inlet. The flange is arranged opposite to the controller retention portion and to the controller to direct to the controller airflow that has passed through the airflow inlet and the airflow passageway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 is a plan view of a blower motor assembly in accordance with the present teachings; and FIG. 2 is a cross-sectional view taken along line 2-2 of FIG. 1.

Corresponding reference numerals indicate corresponding parts throughout the several views of the drawings.

DETAILED DESCRIPTION

Example embodiments will now be described more fully with reference to the accompanying drawings.

With reference to FIGS. 1 and 2, a blower motor assembly in accordance with the present teachings is illustrated at reference numeral 10. The blower motor assembly 10 is configured to rotate a blower, which generates airflow. The blower motor assembly 10 can be used with any suitable system requiring airflow generation, such as any suitable heating, ventilation, and air conditioning (HVAC) system. Suitable HVAC systems include vehicle HVAC systems, such as HVAC systems for passenger vehicles, recreational vehicles, mass transit vehicles, construction vehicles and equipment, aircraft, watercraft, etc. The blower motor assembly 10 can also be used with any suitable non-vehicular HVAC system.

The blower motor assembly 10 generally includes a blower motor case (or motor holder) 12. The case 12 has a first side 14 and a second side 16, which is opposite to the first side 14. Mounted to the case 12 is a shaft 20. The shaft 20 extends from at least the first side 14, and is configured to be connected to a blower. The shaft 20 rotates the blower to generate airflow. The shaft 20 is rotated by a motor 30. The motor 30 can be any suitable motor. The motor 30 is controlled by any suitable blower motor controller 40. The controller 40 is mounted within the case 12 by a controller retention portion 42 of the case 12. The controller retention portion 42 can be any suitable portion of the case 12 that is sized and/or shaped to receive and retain the controller 40. The controller retention portion 42 may also be any suitable separate retention member for securely retaining the controller 40 within the case 12.

The blower motor case 12 defines an airflow inlet 50 at an exterior thereof. In the example illustrated, the airflow inlet 50 is defined by the first side 14 at an outer periphery 52 of the case 12. However, the airflow inlet 50 can be arranged at any other position of the case 12 that is suitable to capture sufficient airflow. The blower motor case 12 further defines an airflow passageway 54, which extends from the airflow inlet 50 to the controller 40 in order to direct airflow to the controller 40 for cooling the controller 40. In the example illustrated, the airflow passageway 54 extends towards the shaft 20 in a direction generally perpendicular to a length of the shaft 20. The airflow inlet 50 extends generally parallel to the shaft 20 in the example illustrated.

The case 12 further defines an airflow passageway flange 60. The flange 60 extends from an end of the airflow passageway 54 that is opposite to the airflow inlet 50. The flange 60 extends from the airflow passageway 54 towards the shaft 20. The flange 60 is generally opposite to at least a portion of the controller 40 and the controller retention portion 42. The flange 60 is generally a shelf that directs airflow flowing through the airflow passageway 54 to the controller 40 in order to cool the controller 40.

In the example illustrated, airflow A flowing through the airflow passageway 54 from the airflow inlet 50 may tend to flow in a direction away from the controller 40 at the end of the airflow passageway 54 opposite to the airflow inlet 50. The flange 60 is generally a shelf that redirects airflow back towards, to, and across the controller 40 to provide a concentrated flow of air to the controller 40 to cool the controller 40. As a result, the motor 30 can be made larger in order to generate increased airflow, and the additional strain on the controller 40 that results from increasing the size of the motor 30 can be accommodated because the flange 60 will direct additional airflow to the controller 40 in order to cool the controller 40. The flange 60 provides numerous additional advantages, such as no water pooling, no collection of foreign matter (which could lead to the blower being blocked and/or unpleasant odors being generated), reduced noise (such as noise that may be generated by cavity pulsation) and enhanced performance (inclusion of a cavity may undesirably disturb airflow).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A blower motor assembly comprising:
   a blower motor case for housing a blower motor therein;
   a controller retention portion of the blower motor case configured to accommodate a controller within the blower motor case;
   an airflow inlet defined by the blower motor case at an exterior of the blower motor case;
   an airflow passageway of the blower motor case extending from the airflow inlet to the controller retention portion to direct airflow to the controller; and
   a flange of the blower motor case at an end of the airflow passageway that is opposite to the airflow inlet, the flange is arranged opposite to the controller retention portion and to the controller to direct to the controller airflow that has passed through the airflow inlet and the airflow passageway.

2. The blower motor assembly of claim 1, further comprising a shaft for turning a blower, the shaft extending from a first side of the blower motor case, the first side is opposite to a second side.

3. The blower motor assembly of claim 2, wherein the airflow inlet is at the first side of the blower motor case.

4. The blower motor assembly of claim 3, wherein the airflow inlet is at an outer periphery of the blower motor case.

5. The blower motor assembly of claim 1, wherein the flange is a shelf that is opposite to the controller retention portion.

6. The blower motor assembly of claim 2, wherein the flange extends perpendicular to the shaft.

7. The blower motor assembly of claim 1, wherein the flange is integral with a portion of the blower motor case defining the airflow passageway.

8. The blower motor assembly of claim 1, wherein the flange guides airflow of the airflow passageway over the controller.

9. The blower motor assembly of claim 1, wherein the airflow passageway extends from the airflow inlet towards a shaft of the blower motor assembly that is rotatable by the blower motor.

10. The blower motor assembly of claim 9, wherein the airflow passageway extends perpendicular to the shaft.

11. A blower motor assembly comprising:
    a blower motor case;
    a blower motor housed within the blower motor case;
    a shaft rotatable by the blower motor, the shaft extending out from within the case;
    a controller retention portion of the blower motor case;

a controller mounted to the controller retention portion within the blower motor case;

an airflow inlet defined by the blower motor case at an exterior of the blower motor case;

an airflow passageway of the blower motor case extending from the airflow inlet to the controller retention portion to direct airflow to the controller and thereby cool the controller; and a flange of the blower motor case at an end of the airflow passageway that is opposite to the airflow inlet, the flange is arranged opposite to the controller to direct airflow that has passed through the airflow inlet and the airflow passageway to the controller.

12. The blower motor assembly of claim 11, wherein the shaft and the airflow passageway extend perpendicular to each other.

13. The blower motor assembly of claim 12, wherein the flange and the shaft extend perpendicular to each other.

14. The blower motor assembly of claim 11, wherein the shaft extends from a first side of the blower motor case that is opposite to the second side of the blower motor case; and wherein the airflow inlet is defined at the first side of the blower motor case.

15. The blower motor assembly of claim 11, wherein the airflow inlet is at an outer periphery of the blower motor case.

16. The blower motor assembly of claim 11, wherein the flange provides an airflow shelf.

17. The blower motor assembly of claim 11, wherein the flange is opposite to the controller retention portion.

18. The blower motor assembly of claim 11, wherein the flange extends across less than an entirety of the controller.

19. The blower motor assembly of claim 11, wherein the airflow passageway extends from the airflow inlet towards the shaft.

20. The blower motor assembly of claim 11, wherein the flange is integral with the airflow passageway.

* * * * *